US012332540B2

(12) United States Patent
Anderson et al.

(10) Patent No.: US 12,332,540 B2
(45) Date of Patent: Jun. 17, 2025

(54) APPARATUS FOR COUPLING TWO SIGNALS

(71) Applicant: MIRAEX SA, Ecublens (CH)

(72) Inventors: Mitchell Anderson, Pully (CH);
Clément Javerzac-Galy, Vulliens (CH);
Olexiy Feofanov, Epalinges (CH);
Tomas Steponavicius, Rome (IT)

(73) Assignee: MIRAEX SA, Ecublens (CH)

( * ) Notice: Subject to any disclaimer, the term of this patent is extended or adjusted under 35 U.S.C. 154(b) by 288 days.

(21) Appl. No.: 17/925,199

(22) PCT Filed: May 7, 2021

(86) PCT No.: PCT/IB2021/053886
§ 371 (c)(1),
(2) Date: Nov. 14, 2022

(87) PCT Pub. No.: WO2021/229388
PCT Pub. Date: Nov. 18, 2021

(65) Prior Publication Data
US 2023/0350268 A1    Nov. 2, 2023

(30) Foreign Application Priority Data
May 15, 2020   (EP) .................................... 20174867

(51) Int. Cl.
*G02F 1/365*   (2006.01)
*G02F 1/35*    (2006.01)
(Continued)

(52) U.S. Cl.
CPC .............. *G02F 1/365* (2013.01); *G02F 1/353* (2013.01); *G02F 1/3534* (2013.01); *G02F 3/00* (2013.01); *G06N 10/40* (2022.01)

(58) Field of Classification Search
CPC ........ G02F 1/353; G02F 1/3546; G02F 1/365; G02F 1/395
See application file for complete search history.

(56) References Cited

U.S. PATENT DOCUMENTS 7,889,992 B1    2/2011  DiVincenzo
2010/0328760 A1  12/2010  Rice
(Continued)

FOREIGN PATENT DOCUMENTS

WO    2012/150568    11/2012
WO    2020/096448    5/2020

OTHER PUBLICATIONS

International Search Report and Written Opinion, as issued by the International Searching Authority, dated Aug. 3, 2021, for International Patent Application No. PCT/IB2021/053886; 11 pages.

*Primary Examiner* — Daniel Petkovsek
(74) *Attorney, Agent, or Firm* — Faegre Drinker Biddle & Reath LLP

(57) ABSTRACT

An apparatus (1) is proposed for providing coupling between at least a first input signal with a first signal frequency, and a second input signal with a second, different signal frequency. The apparatus comprises: a first input port (3); a second input port (5); a first output port (9); a second output port (11); a first waveguide (13); a second waveguide (15), the second waveguide (15) being made of or comprising non-linear material such that a first electromagnetic field generated by a first-waveguide signal in the first waveguide (13) and a second electromagnetic field generated by a second-waveguide signal in the second waveguide (15) are arranged to overlap in the non-linear material; a periodic structure (31, 33); and a phase-matching arrangement (37).

18 Claims, 8 Drawing Sheets

(51) Int. Cl.
 *G02F 3/00* (2006.01)
 *G06N 10/40* (2022.01)

(56) References Cited

U.S. PATENT DOCUMENTS

| | | |
|---|---|---|
| 2018/0113373 A1 | 4/2018 | Witmer |
| 2019/0270635 A1 | 9/2019 | Painter |
| 2023/0185159 A1* | 6/2023 | Anderson .............. G02F 1/353 |
| | | 359/326 |

* cited by examiner

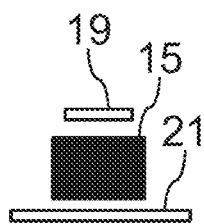 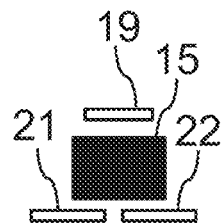 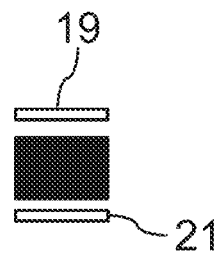 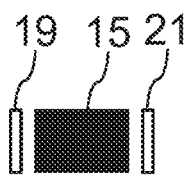
Fig. 4a    Fig. 4b    Fig. 4c    Fig. 4d
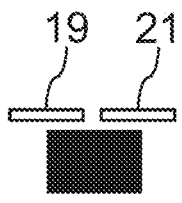 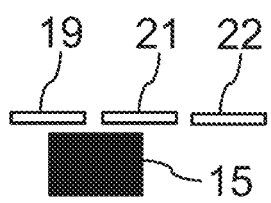 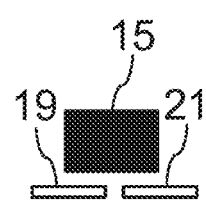 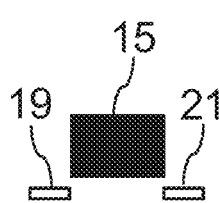
Fig. 4e    Fig. 4f    Fig. 4g    Fig. 4h
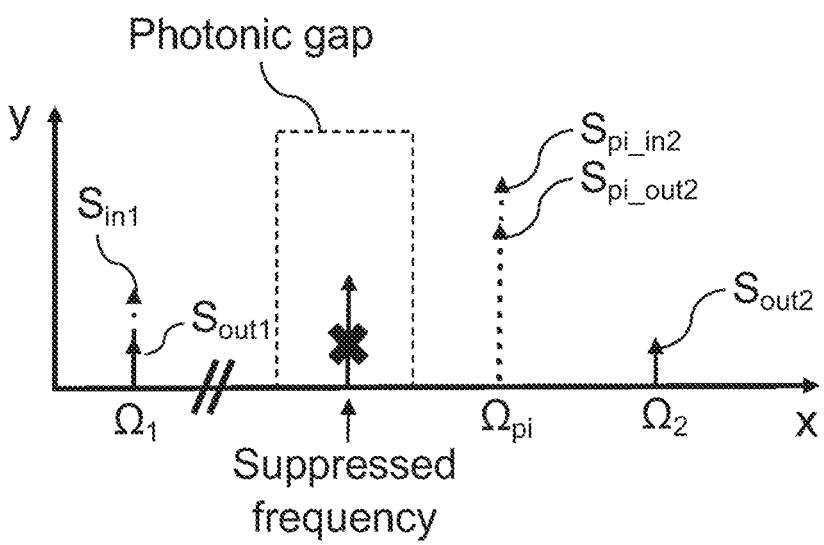
Fig. 5

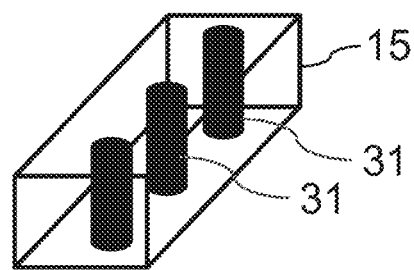
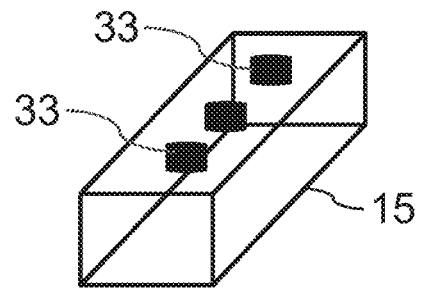
Fig. 9a  Fig. 9b
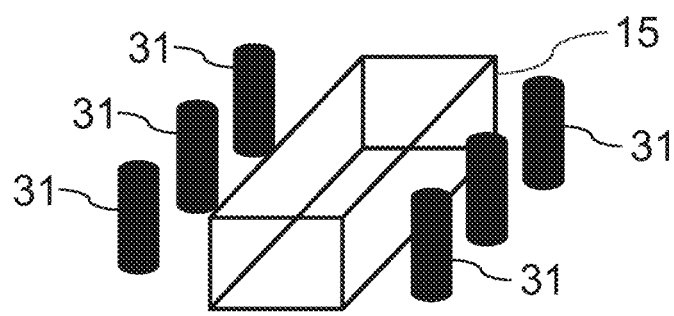
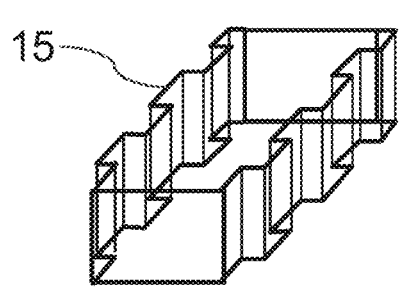
Fig. 9c  Fig. 9d
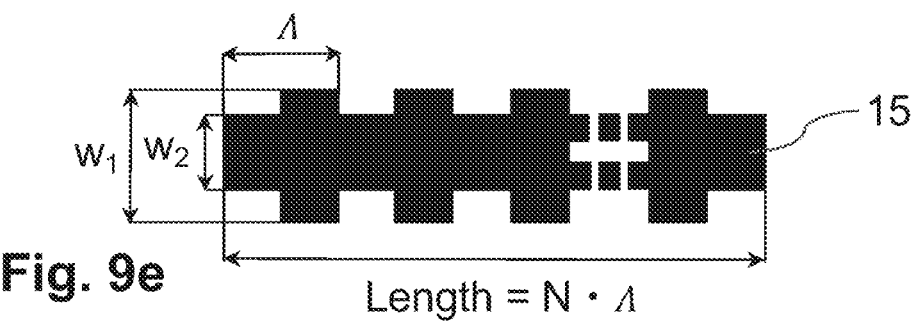
Fig. 9e
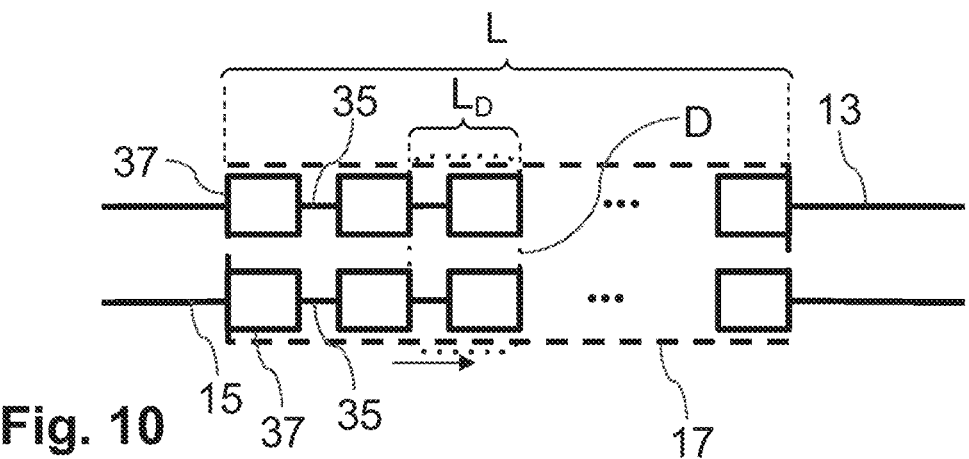
Fig. 10

$$\sqrt{\text{SWAP}} = \begin{bmatrix} 1 & 0 & 0 & 0 \\ 0 & \frac{1}{2}(1+i) & \frac{1}{2}(1-i) & 0 \\ 0 & \frac{1}{2}(1-i) & \frac{1}{2}(1+i) & 0 \\ 0 & 0 & 0 & 1 \end{bmatrix}$$

Fig. 20

$$\text{SWAP} = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

Fig. 21

APPARATUS FOR COUPLING TWO SIGNALS

CROSS-REFERENCE TO RELATED APPLICATIONS

The present application is a national stage entry of International (PCT) Patent Application Number PCT/IB2021/053886, filed May 7, 2021, which claims priority to European Patent Application Number 20174867.0, filed May 15, 2020, the complete disclosures of which are expressly incorporated herein by reference.

TECHNICAL FIELD

The present invention relates to an apparatus configured to couple two signals, such as microwave and optical signals. The proposed apparatus may be used for instance for transferring information between quantum computers by converting microwave photons into optical photons to make the information transfer more robust against thermal noise. The invention also relates to a corresponding method of operating the apparatus.

BACKGROUND OF THE INVENTION

Conversion between signals in the microwave and optical domains is of great interest both for classical telecommunication applications and for connecting quantum computers into a global quantum network. For quantum applications, the conversion should be efficient, and the amount of noise added by the conversion should be minimised. While efficient conversion has been demonstrated using mechanical transducers, they have so far all added a substantial amount of thermal noise.

Some electro-optic converters, such as the one disclosed in US2018/0113373A1, have also been proposed that rely on resonant microwave and resonant optical structures. However, the drawback of these converters is that they can only operate in a fairly limited bandwidth. Furthermore, the coupling efficiency between microwave photons and optical photons of the existing electro-optic converters is also so low that it is difficult to use them for instance to connect quantum computers together.

U.S. Pat. No. 7,889,992 B1 proposes a hybrid superconductor-optical quantum converter, which comprises an optical subsystem configured to receive an optical signal via an optical channel and a superconductor subsystem coupled to the optical subsystem. The drawback of this kind of arrangement is, however, for example that it requires a place to store quantum information, which leads to a delay and thereby also impacts the coupling efficiency.

SUMMARY OF THE INVENTION

It is an object of the present invention to overcome at least some of the problems identified above related to arrangements for coupling different signals together, where the signals may be microwave signals and optical signals. These kinds of devices are sometimes called microwave-to-optical converters.

According to a first aspect of the invention, there is provided an apparatus for coupling between a first input signal with a first signal frequency, and a second input signal with a second, different signal frequency as recited in claim 1.

The proposed new solution has the advantage that the proposed apparatus is able to implement the coupling very efficiently. In other words, the coupling efficiency for converting e.g. microwave photons into optical photons is very high, which means that the apparatus may be used for instance for connecting quantum computers together. The conversion or coupling efficiency may be expressed as the ratio between the number of converted microwave photons and of detected optical photons. The proposed apparatus has also the advantage that the bandwidth of the apparatus is very high, which means that the incoming microwave signals may be spread over a large frequency bandwidth, and the apparatus would still be able to convert microwave photons from these signals into optical photons. Thus, the first and second waveguides are advantageously non-resonator waveguides configured to allow travelling waves to propagate through the first and second waveguides. Furthermore, the apparatus may be designed as a memory-free apparatus. Moreover, the proposed apparatus does not use acoustic (i.e. mechanical) signals, and it is thus an acoustic signal-free apparatus. Also, the proposed apparatus does not use so-called phonon waveguides. It is to be noted that the first input signal, which in this case is a microwave signal, may contain multiple frequency components including microwave noise of any kind, while the second input signal, which in this case is an optical signal, may contain multiple frequency components including optical noise of any kind.

The proposed apparatus may also be used to create a quantum logic gate, for example a SWAP gate or a $\sqrt{\text{SWAP}}$ gate. If the proposed apparatus is used for this purpose, then the invention would also have the advantage of having high quantum gate fidelity (how often the expected result of the gate behaviour would be obtained).

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which:

FIGS. 4a to 4h are cross-sectional schematic views illustrating different configurations for the microwave and optical waveguides that may be used in the apparatus of FIG. 1;

FIGS. 5 to 8 are diagrams showing different example signals in the frequency domain that may be present in the apparatus of FIG. 1 in different application scenarios;

FIGS. 9a to 9e schematically illustrate different arrangements for creating a photonic band gap in the apparatus of FIG. 1;

FIG. 10 schematically illustrates a phase-matching arrangement that may be used in the apparatus of FIG. 1;

FIG. 20 shows the matrix of a square root of a swap gate; and

FIG. 21 shows the matrix of a swap gate.

DETAILED DESCRIPTION OF AN EMBODIMENT OF THE INVENTION

Figure 1:
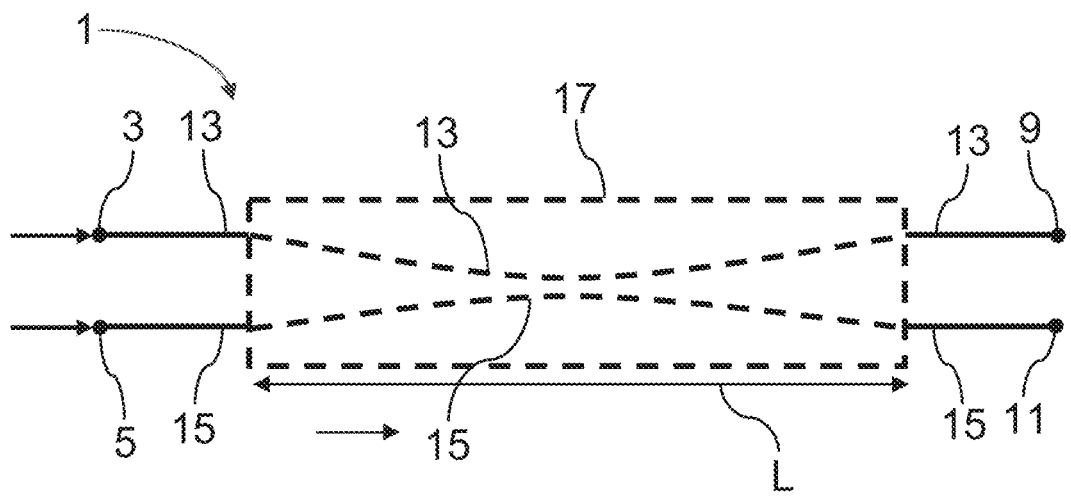
FIG. 1 schematically illustrates the proposed apparatus according to an example embodiment of the present invention.

An embodiment of the present invention will now be described in detail with reference to the attached figures. The embodiment is described in the context of converting quantum information from microwave-frequency quantum processors into optical-frequency photons. For the purpose of the communication between quantum computers, the most suitable final optical frequency in the telecom band but other optical frequencies can be favourable for other applications. The conversion between microwave and optical excitations would typically take place at millikelvin temperatures with sufficiently high efficiency to be of value for quantum communication systems. The proposed apparatus, thanks to its efficiency and bandwidth, opens new opportunities in long distance quantum communications and sensing. However, it is to be noted that the teachings of the invention are not limited to this environment. For instance, the proposed apparatus has both quantum and classical applications. Identical or corresponding functional and structural elements which appear in the different drawings are assigned the same reference numerals.

FIG. 1 schematically illustrates in a simplified manner the structure of an apparatus 1 for generating a coherent coupling between a microwave signal and an optical signal. In this example embodiment, the apparatus thus operates as a microwave-to-optical photon quantum-coherent converter 1, where the quantum state of the photons is preserved during the conversion. The converter comprises a first input terminal or port 3 and a second input terminal or port 5. In this example, the first input port 3 is configured to receive microwave signals, while the second input port 5 is configured to receive optical signals, which may have a first signal component, namely an optical pump signal, and a second signal component, namely an optical non-pump signal. The number of photons in the pump signals is typically much higher than the number of photons in the non-pump signals. The pump signal frequency and the non-pump signal frequency would also typically be different from each other. In the present description, by microwave signals are understood signals which have their signal frequency in the microwave region, while by optical signals are understood signals which have their signal frequency in the optical region. The optical region of the electromagnetic (EM) spectrum refers approximately to the region with wavelengths between 100 nm (3 PHz frequency) and 1 mm (300 GHz) comprising the ultraviolet, visible, and infrared regions. It is to be noted that of particular interest is the near-infrared band used for fibre optic telecommunication, extending approximately from 1260 to 1675 nm, as well as the visible band, extending approximately from 390 to 780 nm. The microwave region of the EM spectrum refers approximately to the region with wavelengths between 1 mm (300 GHz) and 1 m (300 MHz).

As shown in FIG. 1, the apparatus 1 also comprises a first output port 9 and a second output port 11. In this example, the first output port is configured to output microwave signals, while the second output port is configured to output optical signals. A first waveguide 13 is placed between the first input port 3 and the first output port 9. Thus, the first end of the first waveguide is coupled or connected to the first input port 3, while a second, opposite end of the first waveguide 13 is coupled or connected to the first output port 9. Thus, the first waveguide extends longitudinally between the first input port and the first output port. As the microwave signals are arranged to propagate through the first waveguide, this waveguide is also referred to as a microwave waveguide. A second waveguide 15 is placed between the second input port 5 and the second output port 11. Thus, the first end of the second waveguide is coupled or connected to the second input port 5, while a second, opposite end of the second waveguide 15 is coupled or connected to the second output port 11. Thus, the second waveguide extends longitudinally between the second input port and the second output port. As optical signals are arranged to propagate through the second waveguide, this waveguide is also referred to as an optical waveguide.

FIG. 1 also shows an interaction zone 17 with a length L, where the electromagnetic (EM) field generated by the microwave photons travelling inside the microwave waveguide 13 start to interact with the electromagnetic field generated by the optical photons travelling inside the optical waveguide. These two electromagnetic fields are coupled by a non-linear material present in the interaction zone as explained later in more detail. It is to be noted that the apparatus 1 in this example is a cavity-less element. In other words, the interaction apparatus 1 in this example does not comprise any resonant structures, and it is thus a resonator-free apparatus. This means that only travelling waves, as opposed to resonant excitations, are present in the apparatus when it is used.

Figure 2:
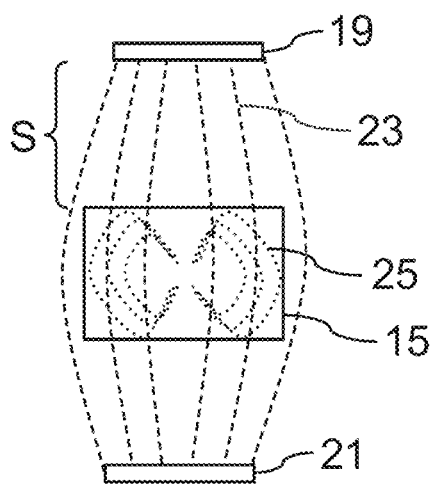
FIG. 2 is a cross-sectional view showing example microwave and optical waveguides that may be used in the apparatus of FIG. 1.
Figure 3:
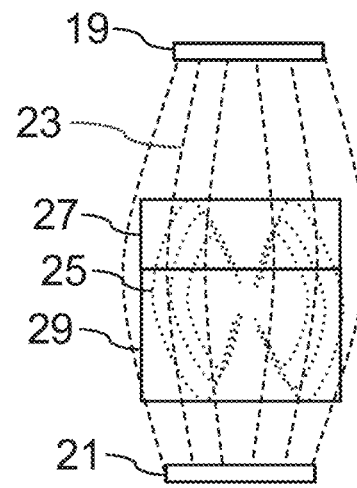
FIG. 3 is a cross-sectional view showing other example microwave and optical waveguides that may be used in the apparatus of FIG. 1.

FIGS. 2 and 3 are cross-sectional views showing two different configurations of the first and second waveguides 13, 15. The cross sections are taken along a plane which is orthogonal to the longitudinal axis of the waveguides. It is to be noted that in the example shown in FIG. 1, the longitudinal axes of the waveguides are curved axes. Referring to the waveguide configurations shown in FIG. 2, the first waveguide 13 comprises a first electrode 19 and a second electrode 21. Furthermore, a dielectric material, in this example a low-loss dielectric material, which may be air for instance, and which is placed between the first and second electrodes 19, 21 may also be considered to be part of the first waveguide 13. In this example, both of these electrodes are superconducting. Microwave signals are thus arranged to travel in the low-loss dielectric material by bouncing between the electrodes. The second waveguide 15 is in the configuration of FIG. 2 also placed between the two electrodes. In this example, the second waveguide 15 is made of the non-linear material, which may also be called an active medium. FIG. 2 also shows first electromagnetic field lines 23 and second electromagnetic field lines 25 (these field lines are shown as dashed lines in FIGS. 2 and 3). The first electromagnetic field lines represent an electromagnetic field corresponding to the photon propagation inside the microwave waveguide 13, while the second electromagnetic field lines represent an electromagnetic field corresponding to the photon propagation inside the optical waveguide 15. It is to be noted that the first and second electrodes do not have to be identical, although they may be identical. Furthermore, the electrodes may be of the same size or smaller or larger than the optical waveguide. One of the two electrodes may be directly grounded or indirectly grounded via a capacitor, an inductor or a resistor. Alternatively, both electrodes 19, 21 may be floating. Moreover, there is preferably a physical gap between the microwave waveguide 13 and the non-linear material. Otherwise the optical field propagation could degrade. The distance between the respective microwave waveguide and the non-linear material is in FIG. 2 denoted by S.

The arrangement of FIG. 3 is similar to the arrangement of FIG. 2, but with the main difference that the optical waveguide 15 comprises a non-linear component or element 27, which is formed by the non-linear material, and a linear component or element 29. Both the non-linear and linear components are dielectrics.

In the example shown in FIG. 3, the non-linear component 27 is placed on top of the linear component 29, to be in direct contact with each other. However, many other alternative arrangements exist to build the composite optical waveguide 15. More specifically, the non-linear component 27 may be placed beneath the linear component 29, or they could be placed side by side. These kinds of arrangements have the advantage that there is no need to etch the non-linear material, which makes the fabrication simpler, but the interaction coupling is not as strong as in the configuration of FIG. 2, where the optical waveguide 15 is entirely or substantially entirely made of the non-linear material. It is also possible to build the optical waveguide so that the linear material would be entirely or substantially entirely encapsulated by the non-linear material apart from its longitudinal ends, i.e., when looking at the cross section of the optical waveguide, the linear material would be entirely or substantially entirely encapsulated by the non-linear material.

FIGS. 4a to 4h are cross-sectional views showing different configurations for the microwave waveguides 13 with respect to the optical waveguide 15. It is to be noted that in FIGS. 4a to 4h, the optical waveguide 15 may be entirely made of the non-linear material or it may be a composite waveguide composed of the non-linear and linear materials. As can be seen, the configurations of FIGS. 4b and 4f comprise a third electrode 22, which is also part of the microwave waveguide 13. Furthermore, in the configuration of FIG. 4f, all the three electrodes 19, 21, 22 are placed side by side on one side of the optical waveguide 15. It is to be noted that one, two, or all of the electrodes of the microwave waveguide 13 may be connected to the first input port 3.

In operation, the apparatus 1 operates as a broadband beam splitter or as a combiner-merger, i.e., a signal incident on any of the input ports, 3, 5 splits into two signals at the output ports 9, 11. To achieve this, one or more optical pump signals and optionally also one or more optical non-pump signals (photons) are fed into the second input port 5, and configured properly as will be explained later in more detail. However, it is also possible to feed a microwave pump signal into the first input port 3. The apparatus 1 is designed to enable efficient interaction between the propagating microwave and optical photons in the non-linear material.

To achieve this, the microwave and optical signals propagating in their respective waveguides are phase-matched or quasi phase-matched. The interaction in the non-linear material is considered to be parametric, i.e., the interaction is activated by providing energy, originating for instance from one or more optical photon sources (e.g., LASERs) (not shown in the drawings), which are used to produce the optical pump signals. The parametric process is instantaneous, and the interaction strength is thereby enhanced by the flux of pump photons (i.e., the optical pump signals). Furthermore, since no high-quality factor resonators are used, the signal bandwidth can be made remarkably high. The frequencies of the pump signals are linearly related to the incident waves' frequencies. It is to be noted that in addition to providing at least one optical pump signal, optionally together with an optical non-pump signal, a direct current (DC) electric field could also be provided. The field direction may be changed periodically to emulate periodic poling as explained later in more detail.

The simplest nonlinear interaction, which can take place in the apparatus 1, is a three-wave mixing resulting in the generation of a sum frequency and a difference frequency. For the three-wave mixing implementation, at least one pump frequency or tone is required. Alternatively, a four-wave mixing, or higher order nonlinearity can be used with a greater number of pump tones (one of which may be a direct current (DC) voltage). Thus, at least two types of non-linear mediums may be used, namely a second-order non-linear material to implement three-wave mixing, and a third order non-linear material to implement four-wave mixing. The interaction in the non-linear material is described by the following equations, where z denotes the axis of wave propagation (and shown in FIG. 1 by the arrows): $\partial_z a_a = -ig_0 a_p b - \Phi_a^{-1} a_a$, and $\partial_z b = -ig_0 a_p^+ a_a - \chi_m^{-1} b$. In the above equations:

i denotes the imaginary unity;

$g_0$ denotes the travelling-wave vacuum coupling strength (this property depends on the material properties);

$a_a$ denotes the resulting photon-field envelope operator;

$a_p$ denotes the pump-photon field envelope operator;

$a_p^+$ denotes the conjugated pump-photon field envelope operator;

b denotes the microwave photon-field envelope operator;

$\chi_a$ denotes the susceptibility of the resulting optical photon mode, which is an optical response function of the waveguide to an input photon; and $\chi_m$ denotes the susceptibility of the microwave photon mode, which is the microwave response function of the waveguide to an input photon.

Furthermore, $g_0$ is proportional to:

$$\Sigma_{z=1}^M \int_{D_z} \in_{ik} \in_{jl} r_{klm}^{(eff)} E_b^m(\omega_b) E_a^i(\omega_a) E_a^j(\omega_a) dD_z,$$

where $D_z$ is one of the M interaction domains, $\in_{ik}$ is the permittivity tensor of the non-linear crystal, $E_b(\omega_b)$ is the electric field generated by the propagating microwave photons at the microwave frequency $\omega_b$, $E_a(\omega_a)$ is the electric field generated by the propagating optical photons at the optical frequency $\omega_a$, and $r_{klm}^{(eff)}$ is the tensor of the effective three-wave-mixing coefficients. Furthermore, i, j, k, l, and m are summation indices that take values 1, 2, and 3 (or alternatively x, y, z as they correspond to the components of the electric field vectors (projections to the coordinate axes) and the permittivity and the effective electro-optic tensors). Here we follow Einstein's summation convention, i.e. when an index variable appears twice in a single term and is not otherwise defined, it implies the summation of that term over all the values of the index. $r_{klm}^{(eff)}$ is material-dependent and additionally pump-dependent (modified by the additional electric field of the optical pump signal). The goal is to maximise go (the coupling strength of the non-linear interaction). One way to achieve this is to optimise the interaction of the electric fields by adjusting the geometry, configuration and spacing of the electrodes 19, 21, 22 of the microwave waveguide 13 with respect to the optical waveguide so that the generated microwave and optical electric fields interact optimally with the non-linear atomic structure (maximising the tensor products in the above equation for $g_0$).

If a second-order non-linear material is used, then r-effective (i.e., $r_{klm}^{(eff)}$) is directly proportional to the electro-optical tensor of the material ($r_{klm}$). Furthermore, in this example, if a second-order non-linear material is used, then only one optical pump signal is necessary (in addition to the microwave signal), optionally together with an optical non-pump signal. Any noncentrosymmetric optical crystalline material, or a combination of such materials, may be used for the second order non-linear material: for instance, $LiNbO_3$, GaP, $BaTiO_3$, $LiTaO_3$, ß-$BaB_2O_4$, AlN, $LiB_3O_5$, $KTiOPO_4$, $KNbO_3$, $KH_2PO_4$, $LiIO_3$, $(NH_4)(H_2PO_4)$, CdSe, GaAs, InN, InSb, ZnTe, and $Pb[Zr_xTi_{1-x}]O_3$. If a third-order non-linear material is used, then r-effective is proportional to the third-order non-linear tensor of the material ($\chi_{klmn}$) and a DC field or an additional pump signal (also called a "tone"). Thus, in this case, at least two energy sources would be needed, namely an optical pump signal and a DC electric field or an additional pump signal, either optical or microwave. In practice, the field $E_n$ is chosen as "DC" (i.e., $\omega_n=0$) when the aim is to avoid any parasitic mixing product. However, the difficulty is that a large DC voltage (a few tens of volts) would need to be applied. Alternatively, in practice, the field $E_n$ is chosen as a microwave or optical pump tone ($\omega_n \approx 0$). The advantage over the DC configuration is that the required voltage is lower than the one in the DC configuration. The techniques above enable controlling and increasing the "effective three-wave mixing" by using the additional field $E_n$. Any centrosymmetric optical crystalline material, or a combination of such materials, may be used for the third-order nonlinear material: for instance, $SiN_x$, $SiO_2$ (Quartz), $Al_2O_3$ (Sapphire), Si, $Gd_3Ga_5O_{12}$, Diamond, SiC, SiGe, $CaF_2$, $MgF_2$.

The present example embodiment features one or more photonic band gaps, referred to simply as photonic gaps, to suppress unwanted output frequencies. A photonic gap is a range of frequencies in a material forbidden for optical fields. A photonic gap may be generated by engineered structures within the material with periodic spatial distributions. Thus, a photonic gap may be understood to arise from a "photonic lattice" with feature dimensions of the same order as the optical photon wavelength. Non-linear interaction usually results in multiple output frequencies (mixing products). To suppress the generation of unwanted mixing products, the optical waveguide 15 is periodically structured so that the unwanted frequency or frequencies fall into a photonic gap or gaps. The dimension of the periodic structure of the waveguide is commensurate with the optical wavelength (which in this example is approximately 1.5 μm).

The diagram of FIG. 5 schematically illustrates some of the signals that are present in the apparatus 1, when a microwave input signal $S_{in1}$ is fed into the first input port 3, and an optical input pump signal $S_{pi\_in2}$ is fed into the second input port 5. In the diagrams of FIGS. 5 to 8, the x-axis represents the signal frequency, while the y-axis represents the number of photons. Furthermore, in FIG. 5, $\Omega_1$ denotes the signal frequency of the microwave signal (input and/or output signal), which in this example propagates through the microwave waveguide 13. In this scenario, a microwave input signal $S_{in1}$ at the first input port 3, and a microwave output signal $S_{out1}$ at the first output port 9 have substantially the same frequency $\Omega_1$. The frequency of the optical input pump signal $S_{pi\_in2}$ and the optical output pump signal $S_{pi\_out2}$ is denoted by $\Omega_{pi}$, while the frequency of the optical non-pump signal (input and/or output) is denoted by $\Omega_2$. As mentioned above, if the second-order nonlinear medium is used in the interaction apparatus, then only one pump signal is needed. The output signal at the second output port 11 comprises a first output signal component, namely an optical output pump signal $S_{pi\_out2}$ but having fewer photons than the optical input pump signal $S_{pi\_in2}$ but substantially the same frequency $\Omega_{pi}$, and a mixed signal or an optical output non-pump signal $S_{out2}$, which is a sum-frequency signal, or an upper-sideband signal, resulting from the signal mixing of the input signals. The frequency of the upper-sideband signal $S_{out2}$ is $\Omega_2$, where $\Omega_2$ is proportional to $\Sigma \alpha_i \Omega_{pi} \beta \Omega_1$, where coefficients $\alpha_i$ (where i may take values from 1 to N) and β are real numbers. In this example, the microwave output signal and the optical non-pump output signal have substantially the same number of photons.

The upper-sideband signal is the desired output signal in the above scenario, and as shown in FIG. 5, its frequency lies in the optical frequency domain. It is to be noted that the number of photons contained in the signals is not necessarily drawn to scale, i.e., the proportions are not necessarily correct. Furthermore, the frequency axis is discontinuous as the microwave frequencies are orders of magnitude smaller than the optical frequencies. It is also to be noted that the number of photons contained in the pump signals is much higher than in the other non-pump signals shown in FIG. 5, and for this reason, the pump signals are drawn with dashed lines. FIG. 5 also shows the location of the photonic gap in the frequency domain. Any frequencies that fall into this gap, such as any undesired lower-sideband frequencies resulting from the mixing of the input signals, are thus suppressed.

It is to be noted that by using the equations above to obtain $\partial_z a_a$ and $\partial_z b$, and when neglecting the photonic gap, in the proposed apparatus 1, the probability of having a lower sideband of the optical frequency is non-zero, whereas the process is designed to maximise the upper sideband. However, the upper sideband is the preferred sideband because it has more energy (energy=h (Planck's constant)×frequency) than the lower sideband. The lower sideband is a parasitic down-conversion process that effectively limits the maximum interaction efficiency that can be achieved according to equations to obtain $\partial_z a_a$ and $\partial_z b$. As explained above, in order to favour the upper sideband, a photonic gap is used (which defines a forbidden frequency domain), and as a result this not only provides a high probability for the upconversion to happen, but it also simplifies the sensing of the optical signal as there is a smaller number of frequency bands to measure. However, it is to be noted that the teachings of the present invention are equally valid, if the lower-sideband signal is kept instead of the upper-sideband signal.

Figure 6:
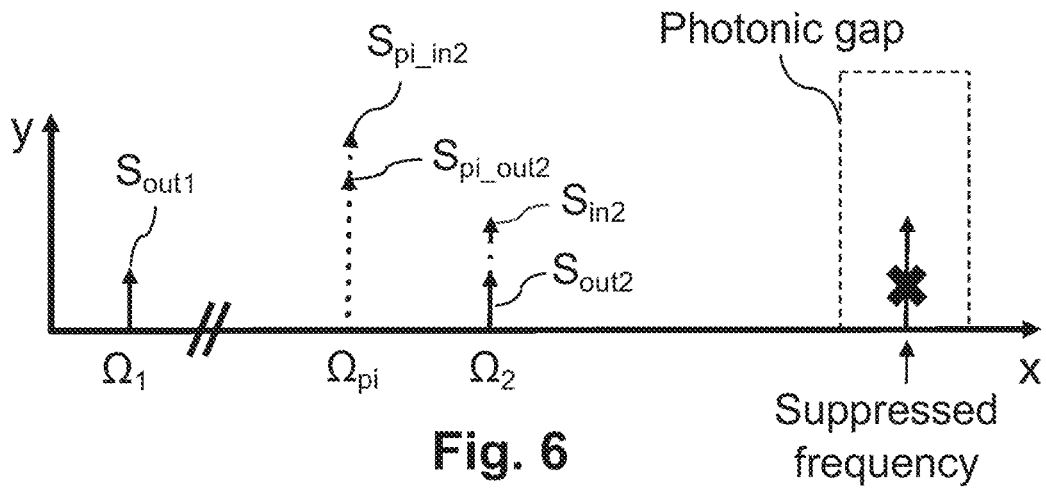

The diagram of FIG. 6 schematically illustrates at least some of the signals that are present in the apparatus 1 when both an optical input non-pump signal $S_{in2}$ and an optical input pump signal $S_{pi\_in2}$ are fed into the second input port 5. In this example, no microwave signal is actively fed into the apparatus 1. However, microwave noise is typically present at the first input port. In this scenario the apparatus is configured to perform the reverse operation to that in the scenario of FIG. 5. In other words, an optical non-pump signal is converted into a microwave signal. In this operation, $\Omega_1$ is proportional to $\beta\Omega_2-\Sigma\alpha_i\Omega_{pi}$, where coefficients $\alpha_i$ (where i may take values from 1 to N) and $\beta$ are real numbers. The suppressed upper sideband frequency is approximately twice the frequency of the optical input non-pump signal $S_{in2}$.

Figure 7:
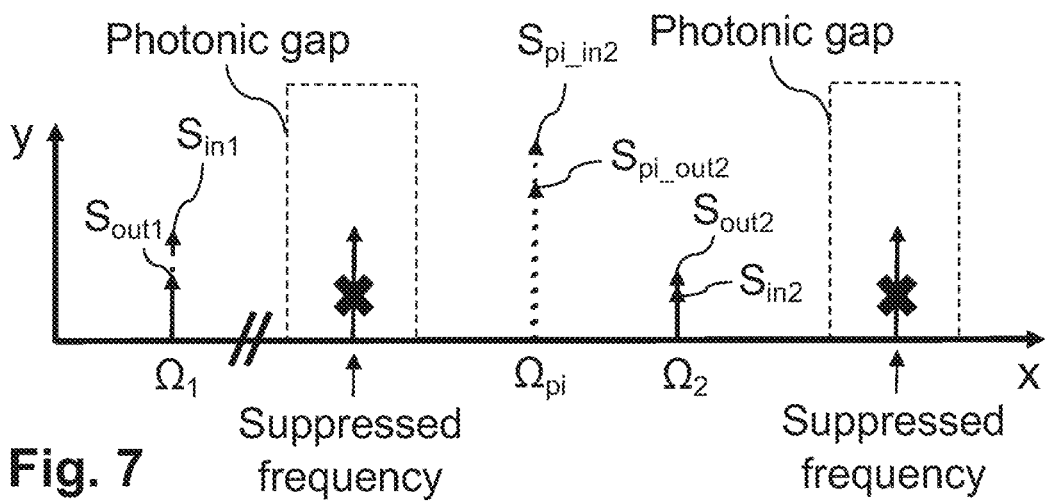
Figure 8:
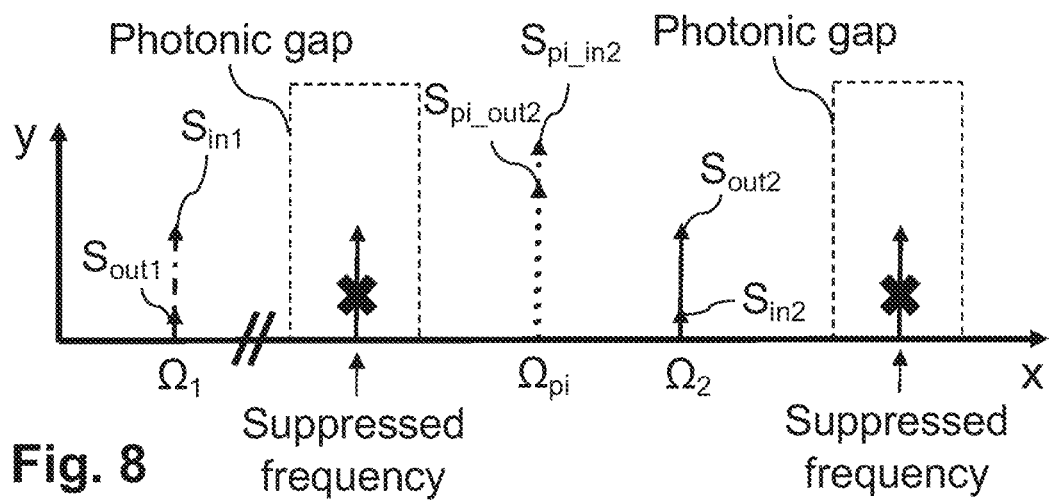

The diagrams of FIGS. 7 and 8 schematically illustrate at least some of the signals that are present in the apparatus 1, when a microwave input signal $S_{in1}$ is fed into the first input port 3 and both an optical input non-pump signal $S_{in2}$ and an optical input pump signal $S_{pi\_in2}$ are fed into the second input port 5. Also in these scenarios, $\Omega_1$ is proportional to $\beta\Omega_2-\Sigma\alpha_i\Omega_{pi}$, where coefficients $\alpha_i$ (where i may take values from 1 to N) and $\beta$ are real numbers. The apparatus in these scenarios has two photonic gaps, namely one for the lower sideband and one for the upper sideband, whose frequency is about twice the frequency of the optical input non-pump signal. In the scenario of FIG. 7, about 50% of the photons of the microwave input signal are converted into optical photons having the frequency $\Omega_2$, and 50% of the photons of the optical input non-pump signal are converted into microwave photons having the frequency $\Omega_1$. The number of photons in each of the output signals $S_{out1}$ and $S_{out2}$ is the average of all the input non-pump photons, i.e., photons in the signals $S_{in1}$ and $S_{in2}$. Thus, the number of output photons in the signal $S_{out1}$ equals the number of photons in the signal $S_{out2}$. The apparatus in the scenario of FIG. 7 thus operates an entangling quantum logic gate, also known as a $\sqrt{SWAP}$ gate. In the scenario of FIG. 8, all or substantially all of the photons of the microwave input signal are converted into optical photons having the frequency $\Omega_2$, and all or substantially all of the photons of the optical input non-pump signal are converted into microwave photons having the frequency $\Omega_1$. The apparatus in the scenario of FIG. 8 thus operates as a SWAP quantum logic gate. It is to be noted that in the above examples, the input signals, or at least some of them, are applied to the apparatus simultaneously. Furthermore, the apparatus is reversible. In other words, input signals may be applied to the apparatus from either end of the apparatus (output signals would then be present at the opposite end).

Various ways are available to create the photonic gaps as explained next. For instance, as shown in FIG. 9a, the photonic gap can be created by having holes 31, which are repeated periodically, and which may be through holes or blind holes, in the optical waveguide 15. The cross section of the holes may have various shapes (even within a single waveguide), but they should be repeated periodically. However, ideally the holes have the same form factor (width/length/thickness) to obtain a perfect photonic gap. If the optical waveguide 15 comprises both the non-linear and linear components 27, 29, then the holes are advantageously made in the linear component 29. However, it would be possible to make them instead (or in addition) in the non-linear component 27. Thus, in the configuration of FIG. 9a, the periodic structure is formed by the holes 31. FIG. 9b illustrates another example of the periodic structure, which in this example is placed on the surface of the optical waveguide 15.

The periodic structure is in this example made of blocks or patches 33, which may be of a different material than the non-linear and/or linear material of the optical waveguide 15. For example, the material of the periodic structure could have a higher or lower refractive index than that of the non-linear material of the optical waveguide 15, which may be for instance made of any material mentioned above, such as silicon. The periodic structure can have any shape, as long as the added structure is periodic. Advantageously, the optical waveguide would have the periodic structure on one or more of its outer surface(s) along the entire, or substantially entire, length of the optical waveguide 15. Yet another way of implementing the photonic gap is to create periodic holes 31 outside of the optical waveguide 15, but in its proximity, as shown in FIG. 9c. This configuration would be feasible, if the dielectric around the optical waveguide is made of solid material. This would change the apparent effective refractive index of the material of the optical waveguide 15. Here again, the holes may be through holes or blind holes and having any desired cross section, as long as the holes are arranged periodically. In the example of FIG. 9d, periodic change of the cross section of the waveguide is used to create different effective refractive indices. The periodic changes may be obtained by corrugations, for example. This configuration is equivalent to having holes on the outer part of the waveguide.

FIG. 9e shows a top view of the integrated optical component of FIG. 9d for a highly effective frequency suppression application to operate as a frequency suppression filter. The component works by preventing the generation of optical signals at the undesired frequency (also called the Bragg frequency) inside the optical waveguide. The general idea of this component is based on a waveguide which exhibits a periodically alternating geometry as presented in FIGS. 9a to 9d. The Bragg frequency may be adjusted by changing the width of the waveguide corrugation (first or greater cross-sectional width wi, and a second or smaller cross-sectional width $w_2$ as shown in FIG. 9e) and its periodicity $\Lambda$.

The effectiveness of the presented component is measured by its sharpness function $\delta f$ that we define as the difference in the frequency domain between points that give reflection values equal to 95% and 5% ($\delta f=f(R95\%)-f(R5\%)$, where R denotes reflection). The photonic (or optical) component we present here shows a high effectiveness as it is able to achieve $\delta f<\Omega_1$, where $\Omega_1$ is the frequency of the microwave input signal.

To achieve better sharpness (i.e. low values of $\delta f$), it is necessary to have the structure (i.e. the waveguide) as long as possible, i.e. N>>1, where N is the number of corrugations or periodic elements, because the value of $\delta f$ decreases rapidly as a power law of $N^{-3}$.

The preferred mode of operation for the optical waveguide is using TE0 mode, since the existing fabrication constraints give a higher degree of freedom to vary $n_{eff1}$, $n_{eff2}$ by alternating $w_1$ and $w_2$. It is to be noted that TE0 is a term used to describe the orientation of the electric field inside waveguides. TE0 means that: a) the electric field is oscillating horizontally inside the waveguide cross section (TE); and b) the electric field amplitude distribution is one cosine function with maximum value at the centre of the waveguide cross-section (TE0). $n_{eff1}$ and $n_{eff2}$ are the effective refractive indices of the waveguide due to the corrugated geometry with widths $w_1$ and $w_2$. We use periodic corrugations to obtain periodic values of $n_{eff1}$, $n_{eff2}$ to obtain photonic gaps as described above. Moreover, it is also preferable to have a large difference $w=w_1-w_2$ as this also translates to a large difference in effective refractive indices $\Delta n=n_{eff1}-n_{eff2}$. A larger value of $\Delta n$ results in a larger sharpness (i.e. lower $\delta f$). However, a certain balance needs to be ensured: $w_1$ may only be increased up to the point where the waveguide starts operating in a multimode regime. This multimode-regime point is defined by the chosen input wavelength $\lambda$, its polarisation, the waveguide geometry (width and thickness) and the material. Therefore, in order to avoid reaching the multimode-regime point, one has to decrease the waveguide thickness, its width and its numerical aperture, and to increase $\lambda$. The numerical aperture (NA) is defined as the range of angles of optical propagation that an optical component can accept. The NA is proportional to the difference in the refractive indices of a waveguide's core and of its cladding. The NA may be decreased by choosing a cladding material that would have its refractive index value close to, but not higher than, the waveguide refractive index. The same criterion applies to $w_2$. However, as for $w_2$, it may not be set to be too low as the mode would not be guided any more. The width limits are set to be roughly between $w_{min} \sim \lambda/5$ and $w_{max} \sim \lambda/1.5$. These boundaries ensure that, on the one hand, the mode is confined and propagates within the waveguide, and on the other hand, the single TE0 mode regime is preserved. Furthermore, the waveguide should be designed to avoid the band-gap closure effect which causes the filtering effect to vanish. This occurs approximately when $w_1 - w_2 \sim \lambda/3$. The photonic crystal waveguide presented here has the advantage that its filtering bandwidth can be as low as the microwave frequency $\Omega_1$. Possible value ranges for some of the above parameters are given below.

Ranges of N:
Extended range: $10 < N < 100'000$;
Acceptable N range: $100 < N < 100'000$; and
Ideal N range: $1000 < N < 100'000$ (At N=1000, 5-95% sharpness is approximately $\delta f = $GHz which is considered as above average performance.)
Ranges of width:
Extended range: 300 nm$<w_2<$600 nm, 800 nm$<w_1<$1200 nm;
Acceptable range: 400 nm$<w_2<$600 nm, 800 nm$<w_1<$1000 nm; and
Ideal range: 500 nm$<w_2<$600 nm, 800 nm$<w_1<$900 nm.
Ranges of $\Delta n$:
Extended range: $0.001 < \Delta n < 2$;
Acceptable range: $0.01 < \Delta n < 2$; and
Ideal range: $0.1 < \Delta n < 2$.

For all the example designs shown in FIGS. 9a to 9e, the distance between the periodic patterns in the structure defines the location and size of the photonic gap. The position of the photonic gap in the frequency domain is inversely proportional to the period of the structure. With such a periodic structure, which thus typically generates a plurality of photonic gaps at different frequencies, the optical waveguide 15 is called a non-linear photonic crystal.

To ensure that the travelling microwave and optical waves can interact efficiently (i.e., the waves' group velocities are nearly matched), and that the interaction contributions that arise from different sections of the waveguides 13, 15 are added constructively, periodic alterations are introduced into the microwave waveguide 13 and/or the optical waveguide 15. Possible alterations include, but are not limited to, any one of the following, and combinations thereof: delay lines (may be applied to any one or both of the microwave and optical waveguides), coupled resonators (may be applied to the microwave waveguide), local modifications of the waveguide geometries (may be applied to any one or both of the microwave and optical waveguides), local modifications of the coupling coefficients (may be applied to any one or both of the microwave and optical waveguides), local modifications of the refractive index (may be applied to any one or both of the microwave and optical waveguides), and periodically poled structure (may be applied to the optical waveguide). It is to be noted that the alteration "local modifications of the coupling coefficients" represents a generalisation of the periodically poled structure. The idea is to locally change the effective electro-optic tensor r. The phase-matching methods may be used to improve the synchronisation of the microwave and optical signals as explained later in more detail. The periodic alterations are schematically illustrated in FIG. 10. As can be seen, in this example, both the microwave and optical waveguides 13, 15 are divided into first segments, referred to as interaction segments 35, and second segments, referred to as alteration segments 37. The combination of two adjacent interaction and alteration segments form a domain D. The length of the domain $L_D$ is ideally the same for both the microwave and optical waveguides 13, 15. In a respective alteration segment 37, the interaction is altered, while no alteration takes place in a respective interaction segment 35. It is to be noted that the interaction takes place along the entire length of the interaction zone L. In this example, the domains are periodically arranged with no spacing between them as shown in FIG. 10, with the length of the period corresponding to $L_D$, where $L_D = \alpha \times \lambda 4$, where $\alpha$ is a positive integer and $\lambda$ is the wavelength of the microwave input signal $S_{in1}$. In other words, the domain length is a multiple of a quarter of the microwave wavelength. The overall structure of the combined domains is designed to achieve phase-matching or quasi-phase-matching (QPM) along the interaction length L. Quasi-phase-matching is a term related to achieving a similar result as true phase-matching (i.e. the coherent interference at the output of the conversion results from different sections of the proposed device) using a periodic structure to cancel the conversion where it produces the negative effect on the output (or to change the sign of the conversion locally to make a section to provide a positive contribution to the output). The true phase-matching implies that the conversion happens everywhere and the sign of the conversion is not altered. The difference between the true phase-matching and the quasi-phase-matching is not in the performance but in the structure used.

Figure 11:
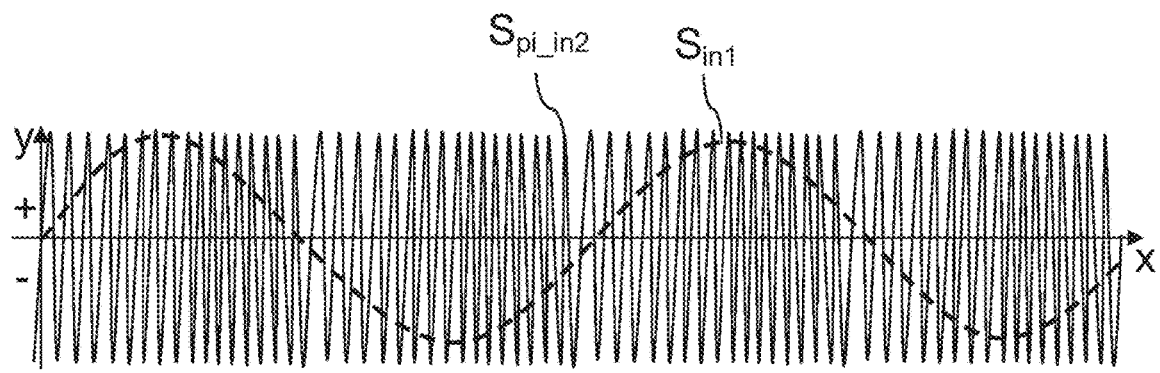
FIG. 11 shows example microwave and optical waveforms in the time domain.
Figure 12:
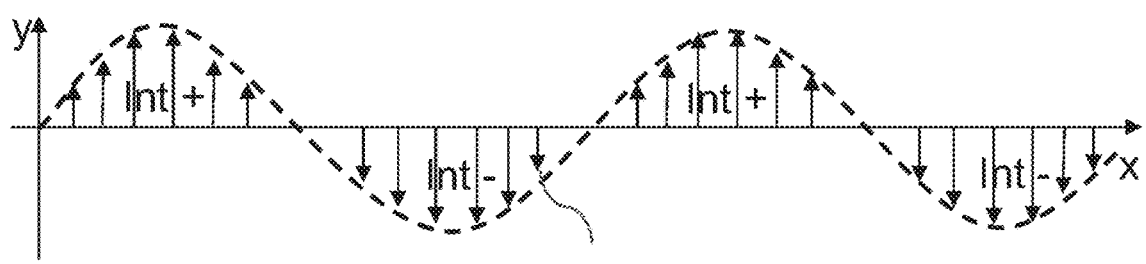
FIG. 12 illustrates how the signals of FIG. 11 may be integrated without carrying out phase-matching.

Before describing some of the alteration options in more detail, it is first illustrated with reference to FIGS. 11 and 12 why it is beneficial to implement the phase-matching in the apparatus 1. FIG. 11 shows example microwave and optical signals in the time domain, while FIG. 12 shows the result of integrating these signals. The y-axis in FIGS. 11 and 12 represents the signal amplitude while the x-axis represents propagation distance along the waveguide. $g_0$ denotes the sum of the integral over the interaction and alteration zones, in other words the sum of the multiplication of the microwave and optical signal levels over one domain D. As shown in FIG. 12, if no phase-matching is carried out, then the integrals would be about 50% of the time positive (when the microwave electric field would be positive) and about 50% of the time negative (when the microwave electric field would be negative), and the end result over the entire domain D (i.e. interaction and alteration zone) would be approximately 0, i.e., $g_0 = 0$. This means that there would not be any interaction or that the amount of the interaction would be very small. To have a non-zero integration result, phase-matching is advantageously used.

Figure 13:
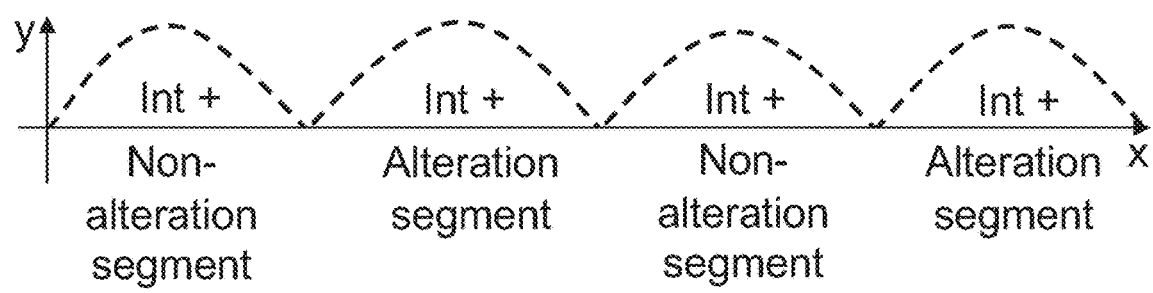
FIG. 13 illustrates how the signals of FIG. 11 may be integrated when applying phase-matching according to a first example.

The periodically poled structure in the non-linear material may for instance be obtained by applying high voltage for a given time duration in the desired locations in the non-linear material or by changing the temperature locally in the desired locations. In this manner, a change of the sign of the electro-optic coefficient (or material tensor) can be obtained in the desired locations in the non-linear material along the propagation axis of the material. More specifically, in this way, the sign of the electro-optic coefficient can be periodically alternated along the propagation axis of the material. As a result, as shown in FIG. 13 (where the x-axis represents the time while the y-axis represents the amplitude), the sum of the integral of the resulting signal will not be zero, thus leading to the desired interaction. This can be explained by the fact that for a non-linear material, $g_0$ is proportional to the sum of the integral of $\int_D \in_{ik}\in_{jl} r_{klm}^{(eff)} E_b^m(\omega_b) E_a^i(\omega_a) E_a^j(\omega_a) dD$, but since the microwave signal is sinusoidal, $E_b$ is positive on one half of the domain D and negative on the other half. Then by using an adequately periodically poled structure, the $r_{klm}$ tensor becomes negative for the part of the domain where $E_b^m$ is negative, thus resulting in a non-zero integral.

Figure 14:
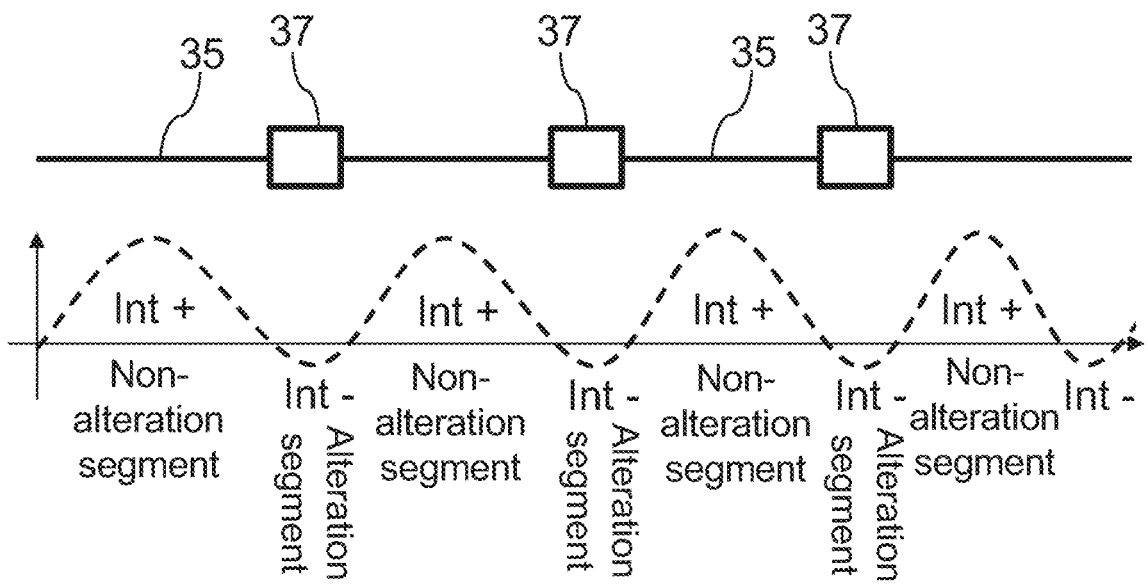
FIG. 14 illustrates how the signals of FIG. 11 may be integrated when applying phase-matching according to a second example.

If the geometry of a waveguide is modified, then this can be implemented by for instance modifying the shape of the waveguide to change the coupling strength of the electro-optics interaction. For example, typically for reducing the interaction, the respective waveguide should be made larger, and for increasing the interaction, the waveguide should be made smaller. It is to be noted that the electro-optic tensor is the material property describing the interaction between microwave signals and optical signals. FIG. 14 illustrates a situation where the microwave and optical waveguide geometries have been changed (the x-axis again representing the propagation distance along the waveguide, and the y-axis representing the signal amplitude). As a result, the sum of the integral of the resulting signal will not be zero, thus leading to the desired interaction. This is achieved so that the positioning (i.e., the distance) and/or the size and/or shape of the microwave and optical waveguides is/are designed so that for one of the microwave signal alternance (negative in FIG. 14) there is minimal coupling strength of the electro-optics interaction in the non-linear material. In practice, for example, the waveguides will lie closer and further away from each other at a periodicity close to the wavelength of the microwave signal.

Figure 15:
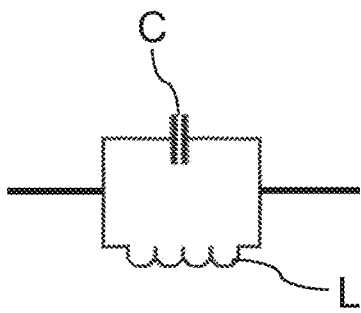
FIG. 15 shows an LC resonant circuit that may be used in conjunction with the apparatus of FIG. 1.
Figure 16:
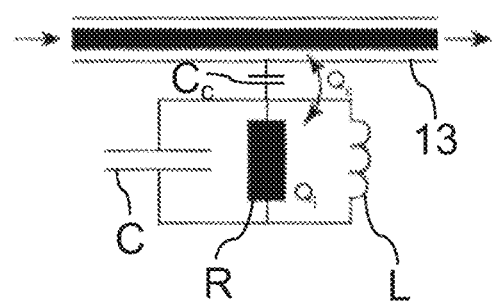
FIG. 16 shows an RLC resonant circuit that may be used in conjunction with the apparatus of FIG. 1.

If coupled resonators are used, then this can be implemented by using coupled microwave resonators. More specifically, the required change in the phase for phase-matching or quasi-phase-matching of the propagating microwave can be achieved by periodically coupling the microwave waveguide 13 to microwave resonators. These resonators would also determine the bandwidth of the microwave signal path. In practice, the coupled microwave resonators can be easily implemented either by using option 1 or option 2. According to option 1, a parallel LC circuit (where L denotes an inductor, and C denotes a capacitor) as shown in FIG. 15 or an RLC circuit (where R denotes a resistor) as shown in FIG. 16 is placed next to the microwave waveguide 13, so that it couples either capacitively of inductively to the waveguide. The inductors and capacitors can be made of discrete components or directly on chip with metal lines and a dielectric. According to option 2, a distributed microwave resonator, or a waveguide type microwave resonator is used, where the waveguide type microwave resonator may be implemented by using a transmission line with an open or short-circuited end, or dielectric material disposed next to the respective waveguide 13, 15.

Figure 17:
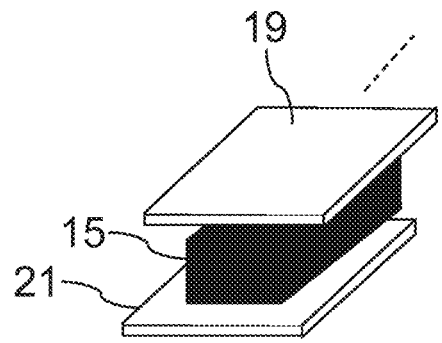
FIG. 17 schematically illustrates the microwave and optical waveguides configuration of FIG. 4c.
Figure 18:
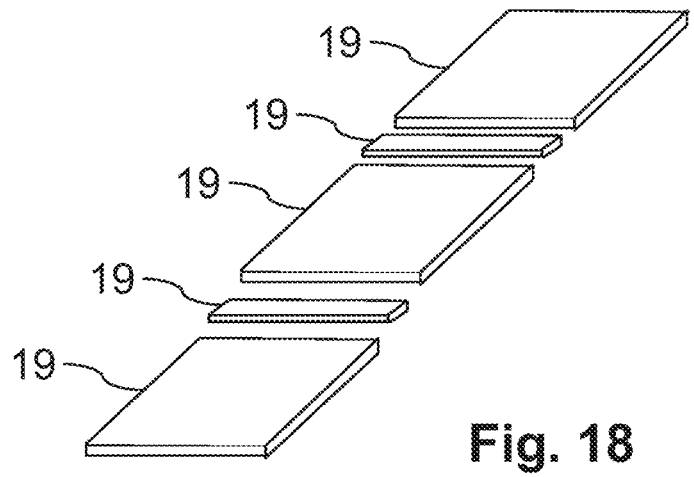
FIG. 18 schematically illustrates an example distributed microwave resonator that may be used in the configuration shown in FIG. 17.
Figure 19:
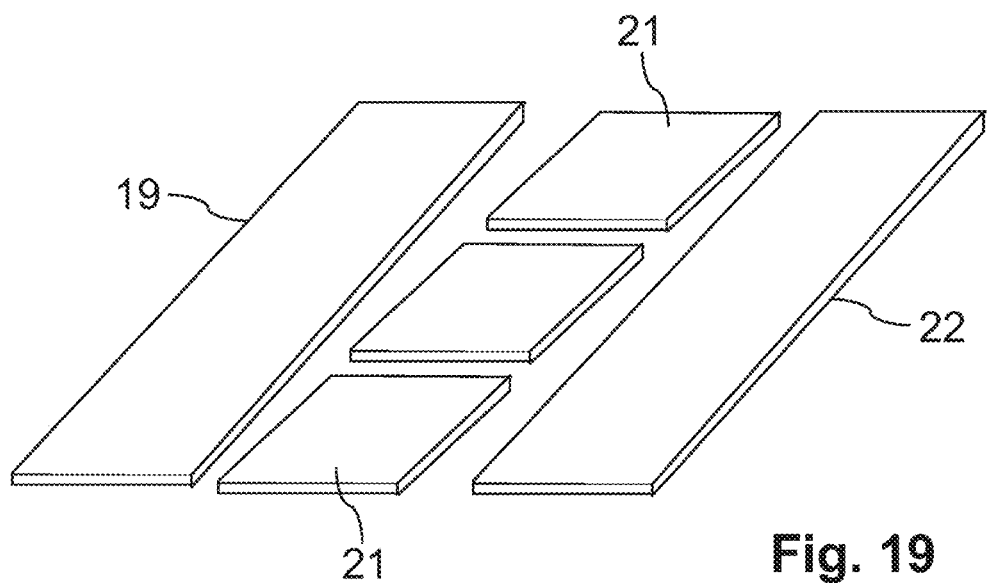
FIG. 19 schematically illustrates an example distributed microwave resonator that may be used in the configuration shown in FIG. 4f.

The distributed microwave resonator according to option 2 is next explained in more detail with illustrations in FIGS. 17 to 19. FIG. 17 represents the configuration of FIG. 4c, where the optical waveguide 15 is located between the first and second electrodes 19, 21. The distributed microwave resonator is in this example obtained by modifying one or both of the superconducting electrodes as shown in FIG. 18. More specifically, the modification may be done by cutting out some portions of the respective electrode 19, 21. FIG. 19 shows how the electrodes may be modified in the configuration of FIG. 4f. In this example, only the middle electrode 21 is modified, but any two of them or all of them could be modified instead. It is to be noted that the leftover regions of the electrode function as distributed microwave resonators. Ideally, these regions are located such that the resulting alteration takes place periodically, resulting in a suitable alteration of the travelling wave, for example as shown in FIG. 14.

As mentioned above, the above-described apparatus 1 may also be used as a quantum logic gate. In the case of a quantum gate, a specific interaction length L is desired so as to define the phase of the quantum gate to be built. This interaction length depends on the vacuum interaction strength go and the applied pump photon flux. However, the longer the interaction length is, the weaker the output signal will be due to light loss in the waveguides. Each domain at least somewhat contributes to the phase of the quantum gate matrix. Once the resulting phase reaches values proportional to a √SWAP gate according to the matrix shown in FIG. 20, then the apparatus operates as an entangling quantum gate (e.g., a single microwave photon incident on the first input port 3 exits the first output port 9 and the second output port 11 with the same probability (50%)). It is to be noted that a √SWAP gate performs half-way of a two-qubit swap. It is universal such that any many-qubit gate can be constructed from only √SWAP and single qubit gates. However, a √SWAP gate is not maximally entangling.

If the interaction length L is doubled compared to the interaction length of the entangling gate, then a SWAP operation or quantum state preserving photon frequency conversion is obtained, leading to the phase matrix shown in FIG. 21, i.e., a single microwave photon received at the first input port 3 is converted into a single optical photon exiting the second output port 11 or a single optical photon received at the second input port 5 is converted into a single microwave photon exiting the first output port 9 (bidirectionality of the conversion). The photon quantum state is preserved during the conversion. It is to be noted that in addition to being longer than a √SWAP gate, the SWAP function requires that the optical carrier frequency ($\Omega_{pi}$) is filtered (for instance by using Bragg grating). The pump is filtered after the apparatus. The filter should be placed after an optical circulator to avoid creating a back-propagating pump-like signal. Thus, a SWAP gate is configured to swap two qubits. A microwave photon converted into an optical photon can then be detected by a single-photon detector that implements a non-linear measurement on qubits operating at microwave frequencies. In other words, the apparatus can be used as a flying-qubit (microwave photon) detector, when used in conjunction with an optical single-photon detector.

Both the entangling and SWAP quantum gates may be used in quantum computers for various purposes. For instance, they may be used for interconnecting quantum computers while preserving quantum state (using SWAP gates) and/or for interconnecting qubits. Each computer may run independently, or joint computing may be implemented. The quantum gates may also, or in addition, be used for multi-node quantum computing, where the goal is to gather computing power of each individual computer to jointly solve a given processing task. This kind of operation would also require preserving the quantum states between the computers. The quantum gates may also, or in addition, be used as part of quantum repeaters (similar to traditional telecom repeaters), to repeat a signal over a longer distance before losing the signal (quantum state in the present case). In this case, a repeater will be composed of a receiving gate (i.e. the apparatus 1 of the present invention), a local small quantum computer to transfer the quantum state of the incoming photon(s) to a high-amplitude output signal (i.e. by creating new output microwave photons from the incoming photon, which is called entanglement swapping), and a transmitter gate (i.e. the apparatus 1 of the present invention when implementing the bidirectionality). All of the above quantum gate applications are possible because the gate is configured to transform a microwave signal into an optical signal that can travel in an optical fibre for a long distance, and at ambient temperature. The optical telecom fibre does not alter the photon state. But after a long propagation distance, light interaction with the fibre imperfections result in loss of photons. For this reason, the propagating signal, even though it keeps its quantum state, cannot be detected any longer because of the low intensity of light.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. Further embodiments may be obtained by combining any of the above teachings.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An apparatus for providing coupling between at least a first input signal ($S_{in1}$) with a first signal frequency, and a second input signal ($S_{pi\_in2}$) with a second, different signal frequency, the first input signal being a microwave signal, and the second input signal being an optical signal, the apparatus comprising:
   a first input port;
   a second input port;
   a first output port;
   a second output port;
   a first waveguide disposed between the first input port and the first output port;
   a second waveguide disposed between the second input port and the second output port, the second waveguide comprising non-linear material such that a first electromagnetic field generated by a first-waveguide signal in the first waveguide and a second electromagnetic field generated by a second-waveguide signal in the second waveguide are arranged to overlap in the non-linear material;
   a periodic structure at least within the second waveguide and/or on a surface of the second waveguide and/or outside of the second waveguide for creating at least one photonic band gap; and
   a phase-matching arrangement to cause the first-waveguide signal in the first waveguide and the second-waveguide signal in the second waveguide to be phase-matched or quasi-phase-matched,
   wherein the first and second waveguides are non-resonator waveguides configured to allow travelling waves to propagate through the first and second waveguides.

2. The apparatus according to claim 1, wherein the first input signal ($S_{in1}$) is a microwave signal, and the second input signal is an optical signal ($S_{pi\_in2}$), and wherein the non-linear material has at least a second order nonlinearity capable of generating a sum frequency signal and/or a difference frequency signal from the first and second electromagnetic fields.

3. The apparatus according to claim 1, wherein the first waveguide comprises at least a first electrode and a second electrode separated from the first electrode by a dielectric.

4. The apparatus according to claim 3, wherein the second waveguide is disposed between the first electrode and the second electrode, or wherein the first and second electrodes are disposed on one side of the second waveguide.

5. The apparatus according to claim 1, wherein the apparatus further comprises a pump source for generating one of the input signals ($S_{in1}$ or $S_{pi\_in2}$).

6. The apparatus according to claim 1, wherein the non-linear material has at least a second-order nonlinearity capable of generating a sum-frequency signal and/or a difference-frequency signal from the first and second electromagnetic fields, and wherein the periodic structure is configured so that the difference and/or sum signal(s) fall(s) into at least one photonic band gap.

7. The apparatus according to claim 1, wherein one or more photons of the first input signal received at the first input port is/are arranged to be fed to the second output port, and/or one or more photons of the second input signal received at the second input port is/are arranged to be fed to the first output port.

8. The apparatus according to claim 1, wherein the second waveguide comprises a non-linear component comprising the non-linear material, and a linear component comprising linear material.

9. The apparatus according to claim 1, wherein the periodic structure comprises a periodic set of holes within the second waveguide and/or outside of the second waveguide, and/or the periodic structure comprises a periodic set of blocks on the second waveguide, and/or the periodic structure is formed by a periodically varied cross-section of the second waveguide along a longitudinal axis of the second waveguide.

10. The apparatus according to claim 1, wherein the phase-matching arrangement is placed within at least one of the first and second waveguides or capacitively connected to the first waveguide.

11. The apparatus according to claim 1, wherein the phase-matching arrangement comprises at least any one of the following means: one or more delay lines, one or more coupled resonators, a periodically varying distance between the first and second waveguides, a periodically varying size of at least one of the first and second waveguides, local modifications of a refractive index, and a periodically poled structure.

12. The apparatus according to claim 1, wherein the periodic structure comprises elements arranged at predefined intervals, and wherein a dimension of the elements substantially orthogonal to a longitudinal axis of the second waveguide is in the range of 0.1 µm to 10 µm, or in the range of 0.5 µm to 5 µm.

13. The apparatus according to claim 1, wherein the non-linear material is made of any noncentrosymmetric optical crystalline material, or is made of any centrosymmetric optical crystalline material, or any combination thereof.

14. The apparatus according to claim 13, wherein said noncentrosymmetric optical crystalline material comprises any one of LiNbO3, GaP, BaTiO3, LiTaO3, ß-BaB2O4, AlN, LiB3O5, KTiOPO4, KNbO3, KH2PO4, LiIO3, (NH4)(H2PO4), CdSe, GaAs, InN, InSb, ZnTe, Pb[ZrxTi1−x]O3, and said centrosymmetric optical crystalline material comprises any one of SiNx, SiO2, Al2O3, Si, Gd3Ga5O12, Diamond, SiC, SiGe, CaF2, and MgF2.

15. The apparatus according to claim 1, wherein the apparatus further comprises a direct current electric field generator to apply a direct current electric field across the non-linear material.

16. The apparatus according to claim 1, wherein the apparatus is a memory-free apparatus.

17. The apparatus according to claim 1, wherein the apparatus is an acoustic signal-free apparatus.

18. A quantum logic gate comprising the apparatus according to claim 1, wherein the quantum logic gate is a quantum entangling gate for a predefined active interaction length L defined by the length of the non-linear material along the second waveguides, and a quantum SWAP gate for an interaction length 2L.

* * * * *